(12) United States Patent
Mühlfelder et al.

(10) Patent No.: US 8,935,046 B2
(45) Date of Patent: Jan. 13, 2015

(54) NAVIGATION DEVICE

(75) Inventors: Mathias Mühlfelder, Würzburg (DE); Jochen Katzer, Gallmersgarten-Bergtshofen (DE)

(73) Assignee: Garmin Switzerland GmbH (CH)

( * ) Notice: Subject to any disclaimer, the term of this patent is extended or adjusted under 35 U.S.C. 154(b) by 1329 days.

(21) Appl. No.: 12/347,021

(22) Filed: Dec. 31, 2008

(65) Prior Publication Data

US 2009/0187335 A1    Jul. 23, 2009

(30) Foreign Application Priority Data

Jan. 18, 2008 (DE) .......................... 10 2008 005 210
May 26, 2008 (DE) .......................... 10 2008 025 053

(51) Int. Cl.
*G01C 21/00* (2006.01)
*G01C 21/36* (2006.01)
(Continued)

(52) U.S. Cl.
CPC ............ *G01C 21/3658* (2013.01); *G01C 21/32* (2013.01); *G08G 1/096861* (2013.01); *G01C 21/26* (2013.01); *G01C 21/3632* (2013.01); *G01C 21/3635* (2013.01); *G08G 1/0969* (2013.01)
USPC ............. 701/37; 701/409; 701/410; 701/428; 701/431; 701/438; 701/532

(58) Field of Classification Search
CPC .... G01C 21/3632; G01C 21/26; G01C 21/32; G01C 21/36; G01C 21/3682; G08G 1/096827; G08G 1/096861; G08G 1/0969
USPC ......... 701/211, 437, 409, 410, 411, 418, 428, 701/431, 432, 438, 532
See application file for complete search history.

(56) References Cited

U.S. PATENT DOCUMENTS 5,343,206 A * 8/1994 Ansaldi et al. .................. 342/70
5,893,045 A * 4/1999 Kusama et al. ............... 701/428
(Continued)

FOREIGN PATENT DOCUMENTS

EP    1 024 347 A1    8/2000
EP    1 681 537 A1    7/2006
(Continued)

OTHER PUBLICATIONS

Anon., "The Motor News gift guide," Business Day (South Africa), Dec. 11, 2007, p. 4.*
(Continued)

*Primary Examiner* — Nicholas D Rosen
(74) *Attorney, Agent, or Firm* — Samuel M. Korte; Mohammad M. Ali

(57) ABSTRACT

Techniques are described for visualizing a roadway transition along an ascertained route course for a navigation device. In an implementation, the navigation device may include a display and a data processing device to identify a roadway transition from a first road onto a second road along an ascertained route course and present navigation information in a first and second operating mode. The second operating mode may include roadway transition visualization generated by dynamically superpositioning a first visualization layer, which may include road characteristics and location information, and a second visualization layer, which may include the ascertained route course along the identified roadway transition.

20 Claims, 11 Drawing Sheets

(51) Int. Cl.
*G01C 21/32* (2006.01)
*G08G 1/0968* (2006.01)
*G01C 21/26* (2006.01)
*G08G 1/0969* (2006.01)

(56) References Cited

U.S. PATENT DOCUMENTS

| | | | | |
|---|---|---|---|---|
| 6,142,871 A * | 11/2000 | Inoue | | 463/6 |
| 6,182,010 B1 * | 1/2001 | Berstis | | 701/441 |
| 6,385,532 B1 * | 5/2002 | Dance et al. | | 701/518 |
| 6,999,075 B2 | 2/2006 | Kumagai | | |
| 6,999,875 B2 * | 2/2006 | Tu | | 701/211 |
| 7,308,359 B1 * | 12/2007 | Krull et al. | | 701/211 |
| 7,349,801 B2 * | 3/2008 | Kim | | 701/446 |
| 7,376,510 B1 | 5/2008 | Green | | 701/209 |
| 7,395,152 B2 * | 7/2008 | Watanabe et al. | | 701/437 |
| 7,414,831 B1 * | 8/2008 | Brown et al. | | 361/679.27 |
| 7,428,460 B2 * | 9/2008 | Atarashi et al. | | 701/208 |
| 7,865,306 B2 * | 1/2011 | Mays | | 701/211 |
| 8,244,460 B2 * | 8/2012 | Kubota et al. | | 701/408 |
| 8,467,962 B2 * | 6/2013 | Irie et al. | | 701/431 |
| 8,538,676 B2 * | 9/2013 | Wuersch et al. | | 701/400 |
| 8,630,801 B2 * | 1/2014 | Katzer | | 701/431 |
| 2001/0027377 A1 * | 10/2001 | Shimabara | | 701/209 |
| 2002/0013659 A1 * | 1/2002 | Kusama | | 701/211 |
| 2002/0138196 A1 * | 9/2002 | Polidi et al. | | 701/208 |
| 2004/0012505 A1 * | 1/2004 | Yokota | | 340/995.1 |
| 2004/0083056 A1 * | 4/2004 | Kim | | 701/211 |
| 2005/0083325 A1 * | 4/2005 | Cho | | 345/419 |
| 2006/0178818 A1 * | 8/2006 | Dhollande | | 701/209 |
| 2006/0271284 A1 * | 11/2006 | Watanabe et al. | | 701/209 |
| 2007/0016367 A1 * | 1/2007 | Sakashita et al. | | 701/211 |
| 2007/0055444 A1 * | 3/2007 | Mikame | | 701/211 |
| 2007/0152804 A1 * | 7/2007 | Breed et al. | | 340/435 |
| 2007/0288158 A1 * | 12/2007 | Dorum | | 701/207 |
| 2008/0015775 A1 * | 1/2008 | Guo et al. | | 701/211 |
| 2008/0036626 A1 * | 2/2008 | Kim | | 340/995.14 |
| 2008/0162032 A1 * | 7/2008 | Wuersch et al. | | 701/201 |
| 2008/0162043 A1 * | 7/2008 | Emoto et al. | | 701/211 |
| 2008/0208450 A1 * | 8/2008 | Katzer | | 701/201 |
| 2008/0312827 A1 * | 12/2008 | Kahlow et al. | | 701/209 |
| 2009/0046111 A1 * | 2/2009 | Joachim et al. | | 345/660 |
| 2009/0143982 A1 * | 6/2009 | Katzer et al. | | 701/213 |
| 2009/0222271 A1 * | 9/2009 | Katzer | | 704/275 |
| 2010/0017117 A1 * | 1/2010 | Irie et al. | | 701/208 |
| 2010/0256899 A1 * | 10/2010 | Katzer | | 701/201 |
| 2010/0312466 A1 * | 12/2010 | Katzer et al. | | 701/201 |
| 2012/0041674 A1 * | 2/2012 | Katzer | | 701/461 |

FOREIGN PATENT DOCUMENTS

| | | |
|---|---|---|
| EP | 1 681 538 A1 | 7/2006 |
| EP | 1 965 173 A2 | 9/2008 |
| JP | 03211412 A | 9/1991 |
| JP | 10030935 A | 2/1998 |
| JP | 10089990 A | 4/1998 |

OTHER PUBLICATIONS

European Search Report dated Mar. 12, 2010.

* cited by examiner

NAVIGATION DEVICE

CROSS-REFERENCE TO RELATED APPLICATION

This application claims the priority benefit of German Patent Application No. 10 2008 005 210.8 filed on Jan. 18, 2008, and German Patent Application No. 10 2008 025 053.8 filed on May 26, 2008, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention relates to a device for ascertaining and displaying a route course, in particular a navigation device, as well as a method for operating such a device.

BACKGROUND OF THE INVENTION

When using navigation devices, it is typical to display roadmap information from road network databases and route course information or route information ascertained by the device with more or less detail depending on the route situation. In the framework of the routing the most clear and realistic representation in regard to the route situation lying before him and to be traveled is to be offered to the user of the navigation system by the device.

The user must turn his attention to both the real traffic situation and also the representation on the navigation device. If the representation deviates too strongly from the real situation, the user must turn a significant part of his attention to the interpretation of the information presented by the navigation device. However, this represents a safety problem in particular in the event of imminent difficult vehicle maneuvers, which require the full attention of the user, because the driver must continuously compare the current surroundings to the representation on the navigation device and must simultaneously keep his eyes on the traffic. The danger of accident therefore rises disproportionately in particular in the event of complex route course changes.

To improve the overview at complex transitions of roads, U.S. Pat. No. 6,999,075 B2 describes the concept and the function of a three-dimensional display in connection with a navigation device for a representation of greatly varying roadway conditions that is as realistic as possible using a corresponding display device. The device shown here comprises an information processing unit, which generates map information including information about a roadway to a destination and route information. In the display the device takes into consideration uphill roadway components and downhill or straight-ahead roadway components. In addition, this patent specification describes a plurality of possible roadway constellations which may be visualized for the user.

However, the recognition value for the user of the navigation system in regard to the actual route conditions, so that he may assign the information displayed by the navigation device clearly to the actual route conditions, is classified as low and entirely worthy of improvement, if actual practical relief of the user is to be achieved. These are more or less only schematic representations which are exclusively restricted to the visualization of the roadway network and the route to be traveled and differing elevations of the roadways.

Proceeding from this prior art, a need exists for a device that ascertains and displays a route course, as well as, a suitable operating method for such a device, the display of the device being configured to ensure the highest possible recognition value in regard to the real appearance of a complex route course for the user.

SUMMARY OF THE INVENTION

One embodiment of the present invention provides an automatic and especially simple and intuitive recognizability of the representation of complex intersection situations and turnoff situations for the user on the display screen of a navigation device. A high degree of the correspondence between the view offered to the user before a complex intersection, for example, and the representation of the corresponding navigation maneuver on the display screen is to be achieved. In this way, comfort and security in the use of navigation devices are to be decisively improved, in particular beforehand during the routing for complex road transitions.

A device incorporating the present invention is used in a way initially known per se for ascertaining and displaying a route course, included in a road network, for a transportation means and comprises a data processing device, which is also used for ascertaining the route course, and display means, which are also used to visualize the ascertained route course. The device acquires the road network information from a road network data base which is at least temporarily accessible by the device and which the device may comprise or which may be located outside the device and may be accessible using an online access, for example. A download or an occasional data update as needed would also be conceivable, so that road network data are available locally and off-line on the device using online access after a download, for example.

The device is set up in such a way that upon the existence of a direction change required for following the ascertained route course, which is characterized by a transition of the route course from a first road onto a second road and by leaving the first road, in particular based on a road intersection or based on a road turnoff, a change occurs between at least a first and a second operating mode, one of the at least two operating modes being used for dynamic and perspective visualization of the transition by superimposing at least two visualization layers.

At all transitions (e.g., a freeway exit), it is thus possible to show a view of the transition having very high recognition value for the user in consideration of the surroundings, which ensures a better overview during the imminent maneuver and reduces the risk of accident. The first operating mode represents the typical representation of the route course in the road network (e.g., a 2-D display). The independent and dynamic change from the first to the second operating mode as a function of an imminent transition results in relief of the user whenever he must turn his full attention to the imminent maneuver. After executing the maneuver by passing the transition, an automatic change from the second (e.g., 3-D display) operating mode back into the first operating mode or another operating mode may be performed again.

In the event of multiple complex transitions following one another closely (e.g., turnoffs or exits), an embodiment of the invention provides the ability to identify the relevant transition is increased still further, which represents an additional value to the user by measurably better destination guiding (time and cost saving). The rapid comprehension of the current situation (e.g., an exit situation), for example, by a large-area graphic and/or photorealistic representation of a freeway exit, makes it easier for the user to concentrate on the traffic and helps to avoid accidents or traffic obstructions. Through the realistic implementation of the surroundings on the navigation device incorporating the invention, for example, by high information density and photorealistic representation of all texts which are actually found on the surrounding traffic signs, the user will establish a high recognition value in regard to the real surroundings. In addition, because of the dynamic operating principle, it is not necessary to store static individual image data sets of concrete road transition situations, because the device generates the image information required for the visualization taking into consideration the currently ascertained road transition situation automatically beforehand or on demand and thus does not have to keep it in the memory. Critical storage space is thus saved on mobile devices, which in turn decreases the provision costs for the user, and even less frequently traveled transition situations, for which static predefined individual image data sets are typically not provided, may be visualized with extremely high flexibility and with a high recognition value.

Approaches known from the prior art have the disadvantage, for example, that upon the generation of the image (e.g., of a freeway intersection), static image source material must be used, which is especially and exclusively only kept in the memory for the currently concerned intersection. The generation of such so-called Reality Views or Junction Views for freeway intersections is technically conceivable for any intersection, however, due to the manual acquisition of the intersections to be performed beforehand and the storage of the acquired data, apart from the required effort, a restriction of the coverage is also to be mentioned, because all intersections may not be traveled and stored by the provider of the map material for reasons of cost. The feature Reality View is therefore currently not available especially for freeway exits because of a lack of data and would require an enormous local storage capacity, if one wanted to store these data locally in the device, for example, in addition to the significant quantity of map data already existing.

It is also typical to ascertain information about the lane situation (Lane Info) prevailing at a transition situation and to display it during the navigation on the display means.

To increase the recognition value for the user of the device, the device is preferably set up in such a way that information ascertainable from the road network data base and being relevant for the route course, in particular information in regard to the real signage on the road edge, is taken into consideration in the visualization. In addition, in particular for the visualization of traffic signs, information may be ascertained and taken into account in consideration of the country in which the device is operated, this information preferably being displayable mirror-reversed in consideration of left-hand traffic or right-hand traffic, whichever is typical in this country. A higher recognition value for the user of the device may also be achieved in that information relevant in regard to the ascertained route course (e.g., location name/symbols) may be marked on traffic signs shown on the display means.

The change between the operating modes may also be implemented in accordance with a least one operating mode control parameter and/or one operating mode policy, both of which may be based, for example, on information relevant for the transition from a road network data base. As a concrete example, an instruction in the form of a sign shortly before a route-relevant exit could be cited, by which the activation according to one embodiment of the invention of the corresponding operating mode for perspective and dynamic visualization of the imminent transition could be triggered, an immediate deactivation of the perspective visualization occurring as soon as the transition has been passed by the user of the device using the transportation means.

A visualization layer preferably comprises at least one image data set, by which the preparation of a visualization layer would be able to be implemented flexibly and dynamically using the various image materials, which further increases the modularity of the concept according to another embodiment of the invention.

The superposition of visualization layers and/or image data sets may be implemented according to a least one superposition control parameter and/or one superposition policy, so that it can then be established which visualization layers or image data sets are to be superimposed in which way. This increases the flexibility during the generation of a visualization which is as realistic and dynamic as possible using the device.

Several measures are listed hereafter, using which the recognition value of the visualized image may be additionally increased. This may preferably be achieved, for example, in that a visualization layer or an image data set having at least one photographic or videographic picture of the real transition is also provided for the superposition, or that also a visualization layer or an image data set having at least one three-dimensionally and/or photorealistically rendered picture of the real road transition is provided, or that also a visualization layer or an image data set is provided for the representation of at least one graphic curve and/or at least one continuous arrow to symbolize the ascertained route course, or that also a visualization layer or an image data set having a movable or changeable graphic element is provided, the graphic element symbolizing the current location of the device, or that also a visualization layer or an image data set having further graphic elements is provided, in particular having traffic signs, bridges, underpasses, points of interest, icons, tunnels, building silhouettes, or landscape features, based on the real surroundings of the road transition.

In regard to the memory management, it is advantageous if the contents of the visualization layers or the image data sets are stored at least partially independently of the finished perspective representation generated using superposition and are retrievable modularly.

Furthermore, the invention can be embodied in a method for operating a device for ascertaining and displaying a route course, comprised by a road network, for a transportation means. The device is particularly a navigation device, as already described in detail above.

The method according to the invention comprises the following method steps, the selected sequence not having to correspond to the sequence of the actual implementation or execution during the operation.

In the context of the method, the representation of the current movement direction of the transportation means within the road network is performed on the display means in the context of a first operating mode. The display means is continuously and automatically updated by the device in this regard and as a function of the current position.

Furthermore, in the context of the method, the ascertainment and/or representation of a required direction change are performed, which is necessary to follow the ascertained route course using the transportation means and which is caused by a transition from a first road of the road network onto a second road of the road network. This transition and/or direction change is understood as a change of the current road traveled using the transportation means to be performed actively by the user of the device, which is necessary to follow the ascertained route course to the destination. Such a change may also, for example, be characterized by an exit, in particular a freeway exit possibly accompanied by a lane change, or also by the required turn at an intersection or by a road transition at an imminent turnoff.

In the context of the operation according to an embodiment of the invention, an automatic change occurs between two operating modes for dynamic visualization of the transition on the display means. Dynamic visualization is understood with respect to the invention to mean that the device automatically generates and/or automatically superimposes the visualization layers necessary for visualizing the transition situation. The image information is thus not kept statically, using a memory, for example, for all conceivable transitions, but rather is provided in a route-specific manner by the device. However, this does not mean that the data for visualizing the transition situation must be provided precisely at the moment when the transition situation is directly imminent. The specific visualization layers for this route course may be prepared by the device (i.e., generated and/or superimposed) already during the initial ascertainment of the route course, as soon as the destination is known, or at times, during which the data processing means are not busy, for example, so that they are retrievable more rapidly in the course of the routing.

The advantages resulting therefrom have already been described in the context of the explanation of the device according to the invention, therefore, reference is made to these passages. Nonetheless, it is particularly emphasized once again that critical memory space may be saved using the method incorporating the invention, in particular on mobile devices, and the recognizability of the surroundings may be increased for the user.

To visualize the transition, information in regard to the at least one road network at least sectionally prevailing after the transition is also preferably ascertained and taken into consideration using the road network database. This allows an analysis of the route situation, in particular the curve situation for the following route after the transition, in particular in the event of an exit. Taking this analysis into consideration, the visualization of this exit situation on the display means may also be performed, for example, in the context of the selection or generation of a suitable image data set or a suitable visualization layer. For example, the following roadway situation may also be represented to prepare the driver, for example, in the case of a strong left or right curve, so that the driver may prepare for and/or be forewarned of the imminent maneuver.

Furthermore, elevation data in regard to the road network participating in the transition are preferably also ascertained and taken into consideration using the road network database. The search of the elevation data for a freeway exit, for example, is performed in the map material of the map producer (road network database). It may be derived from the result of this search, for example, which visualization layer(s) must be used for the representation on the display means. For example, if the road following the transition runs over the freeway in the further roadway course, this may be recognized on the basis of the elevation data model of the freeway exit and the relevant roadway sections in the map material of the data producer. In the implementation of such a view, a visualization layer or an image data set having a bridge symbol for the outgoing roadway after the exit may correspondingly be used (roadway runs above the freeway here). If the freeway itself lies higher and the outgoing roadway or the adjoining roadway lies lower, a visualization layer or an image data set having an underpass symbol may be shown. All of these measures increase the recognition value of the real situation in relation to the representation on the device.

It is especially advantageous if, in the context of the visualization, the characteristics of the roads from the road network database participating in the transition are also ascertained and taken into consideration, in particular the number of the lanes, left/right-hand traffic, geometric properties of the lanes, or also overpass situations and/or underpass situations here.

Preferably, further relevant information in regard to the road network participating in the transition is also ascertained and taken into consideration using the road network database accessible for the device, in particular information in regard to the real signage of the roads, the representation of signs being performed in particular taking into consideration the country in which the device is operated. Whenever possible, this information from the map material, which is provided in any case, is to be used and/or analyzed for the visualization to make the visualization realistic.

The current local time of day prevailing at the operating location of the device is especially preferably also ascertained and taken into consideration to consider day or night in the perspective visualization. Thus, for example, a day/night view of the transition to be visualized may be implemented.

Furthermore, it is advantageous, for a visualization which conforms to reality as much as possible, that the characteristics of the environmental conditions prevailing at the road transition are also ascertained and taken into consideration, in particular the presence of bridges, underpasses, points of interest, icons, tunnels, building silhouettes, or landscape features. All of these measures simplify the processing of the information shown on the display means for the user by comparing the actual environment to the representation on the display means.

The change between the operating modes may also be performed in accordance with at least one operating mode control parameter and/or one operating mode policy. The policy may be based, for example, on a logically linkable command sequence or the like, similar to a programming language, which is taken into consideration by the device when activating the display means (e.g., by interpreters), in that, for example, information relevant for the transition from a road network database is dealt with in the policy and converted into control instructions for the visualization procedure. Traffic signs before an exit are to be cited as a concrete example, which are queried and recognized by the policy in a targeted way as a function of the position, so that subsequently the automatic activation of the perspective visualization may be performed, an immediate deactivation of the perspective visualization occurring again as soon as the exit has been passed.

In addition, an at least partial superposition of a third visualization layer may be performed, which comprises visualization means for identifying the route course along the transition, in particular at least one arrow symbol to symbolize a direction change and/or lane change to be performed using the transportation means.

It is also conceivable that in addition an at least partial superposition of a fourth visualization layer is performed, which is used to represent route-specific and/or location-specific information ascertainable from the road network database or, in addition, an at least partial superposition of further visualization layers is used to represent further information ascertainable from the road network database and/or navigation-relevant information ascertained during operation or beforehand.

Moreover, of course, navigation-relevant information is also additionally overlaid by the display means, so that a perspective overall image of the transition arises, which increases the recognition value of the surroundings for the user.

The visualization layers preferably comprise image data sets or least partial areas of image data sets which may in turn be used to implement the visualization layer. The flexibility in the design of visualization layers is thus increased, because parts of multiple modular image data sets may also be used jointly for implementing a visualization layer.

The superposition of the image data sets is preferably performed in accordance with at least one visualization control parameter and/or one visualization policy, whereby the current transition to be visualized may be dealt with individually, for example, taking into consideration the information which may be output from the road network database, which in turn increases the realism of the situation shown on the display means.

Of course, devices incorporating to the invention may be used in arbitrary countries. It is to be taken into consideration, however, that in some countries, such as the UK and Australia, left-hand traffic is typical. For this purpose, visualization layers accessible for the device are at least partially processed for the least partial representation of the transition in the event of left-hand traffic so that the image information may be displayed on the display means mirror-reversed in regard to the starting image data set and/or the visualization layer provided before the processing. Using this measure, valuable storage space may be saved in turn in particular in mobile devices, because image data material that is provided anyway is used.

Country-specific special features may also be taken into consideration in regard to display parameters of the signage, which are taken into consideration when displaying adaptations of the signs individually by country, such as the color, font characters, symbols used, etc.

To further improve the destination guiding, means are provided for special identification of a location which may be overlaid within a visualization layer. The visualization of the destination location for example on a street sign shown using a visualization layer may additionally be used to particularly emphasize and/or identify the place name on the sign. Thus, for example, it is possible to specially mark the affected location on the exit sign as cursive, bold, semitransparent, in another type or color of font, or using another identification means.

Depending on the complexity of the transition situation to be shown, on the basis of the modular concept, more or less information may be provided flexibly and dynamically by the device for the user on the display means. For example, the following information may be included:
a) number of the lanes;
b) marking of the lane to be used;
c) display of surroundings of a freeway exit, which approximates the real surroundings (city or country and further environmental details);
d) detailed implementation of traffic signs of the exit;
e) output of exit numbers;
f) font color and sign color on traffic signs;
g) correct positioning of various text lines and symbols on traffic signs, such as an icon for an airport before or after a specific text line on the traffic sign or the icon for a federal highway.

It is to be noted that in the achievement of the object according to one embodiment of the invention, the visualization layers may be superimposed in arbitrary sequence. Thus, the first visualization layer may be superimposed with the third and/or fourth visualization layers or the second visualization layer may be superimposed with the third and/or fourth or with further visualization layers. The fundamental condition, however, is always that at least one visualization layer is provided to represent the route.

The method incorporating to the invention is especially preferably used at freeway exits or forks, because the data supply of graphically prepared so-called Reality View images in the road network databases is not complete in this regard and transitions which are not provided in the data supply may also be covered using an embodiment of the invention on the basis of the dynamization.

Preferred embodiments of the invention are explained in greater detail hereafter on the basis of schematic drawings, which only show exemplary embodiments.

DETAILED DESCRIPTION OF THE EXAMPLE EMBODIMENTS

Figure 1:
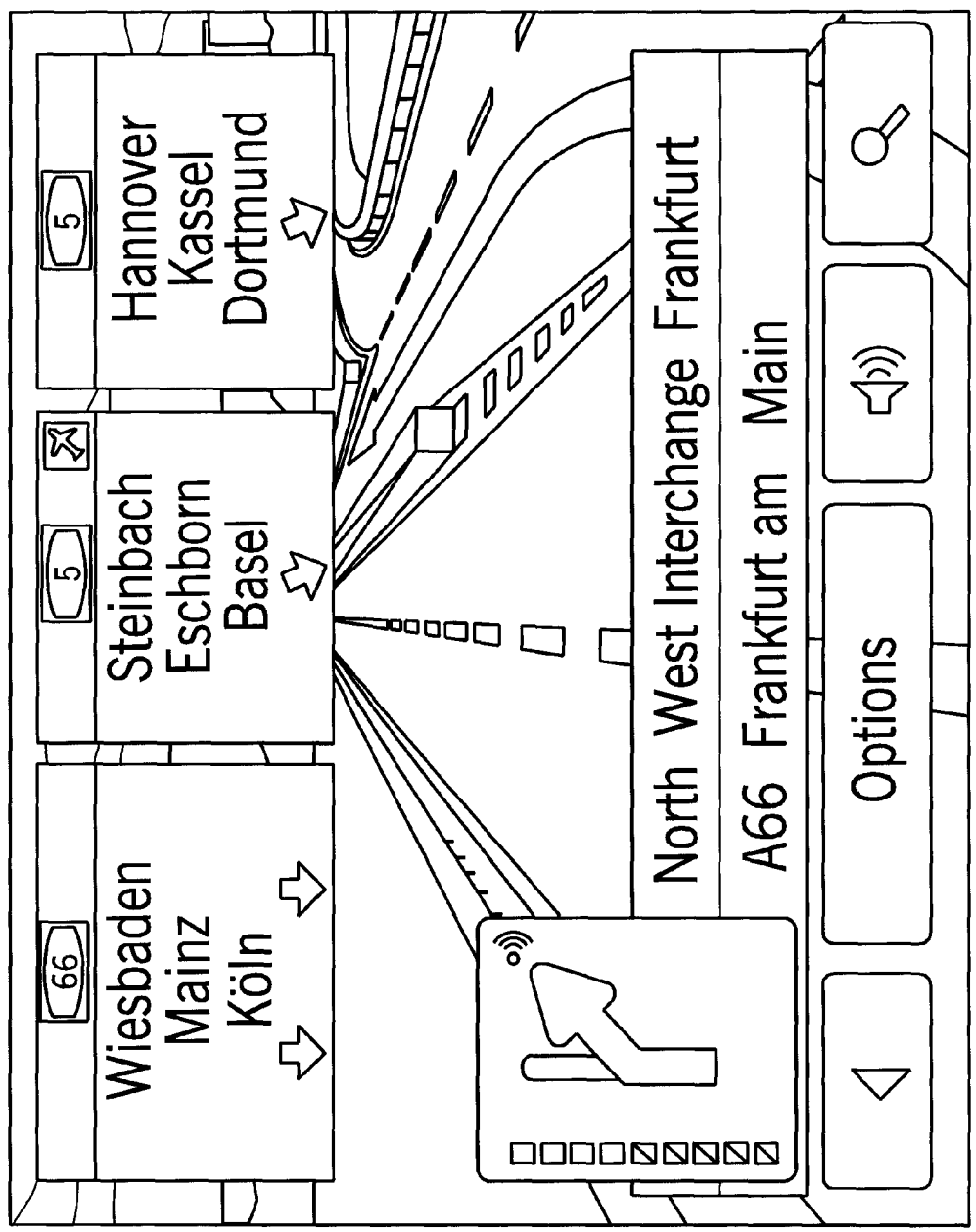
FIG. 1 shows a so-called Reality View (perspective illustration)
Figure 2:
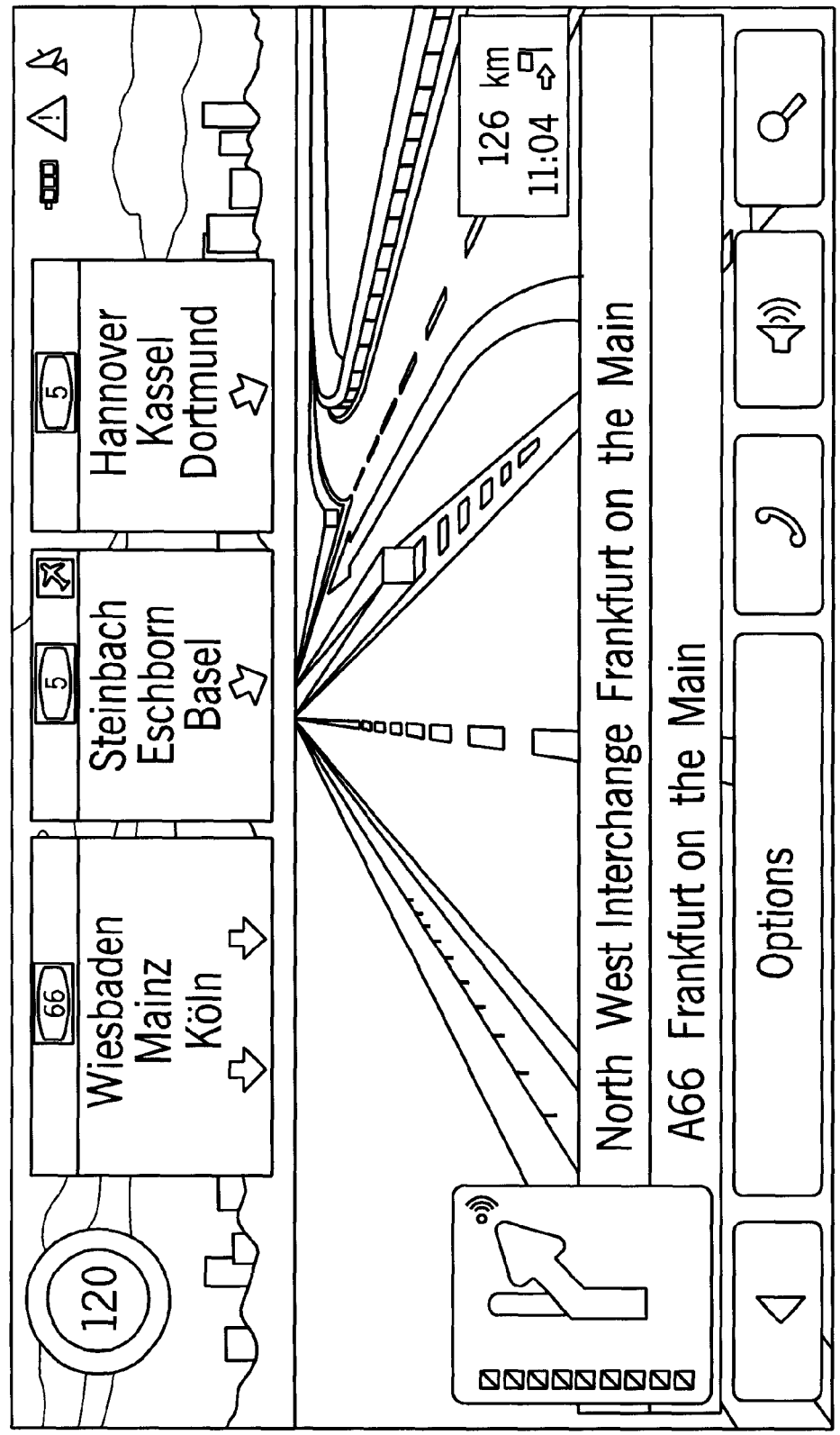
FIG. 2 also shows a so-called Reality View.

FIG. 1 and FIG. 2 show the known Reality View principle. An image is displayed in perspective for a freeway intersection based on statically provided starting image material especially for this affected freeway intersection. The generation of Reality Views is technically conceivable in general for any intersection, however, a restriction of the coverage is to be expected due to the manual acquisition of the intersections by the map producer, which is to be performed beforehand, and the storage of the acquired data, because not all intersections may be traveled and stored by the map producer for reasons of cost.

Figure 3:
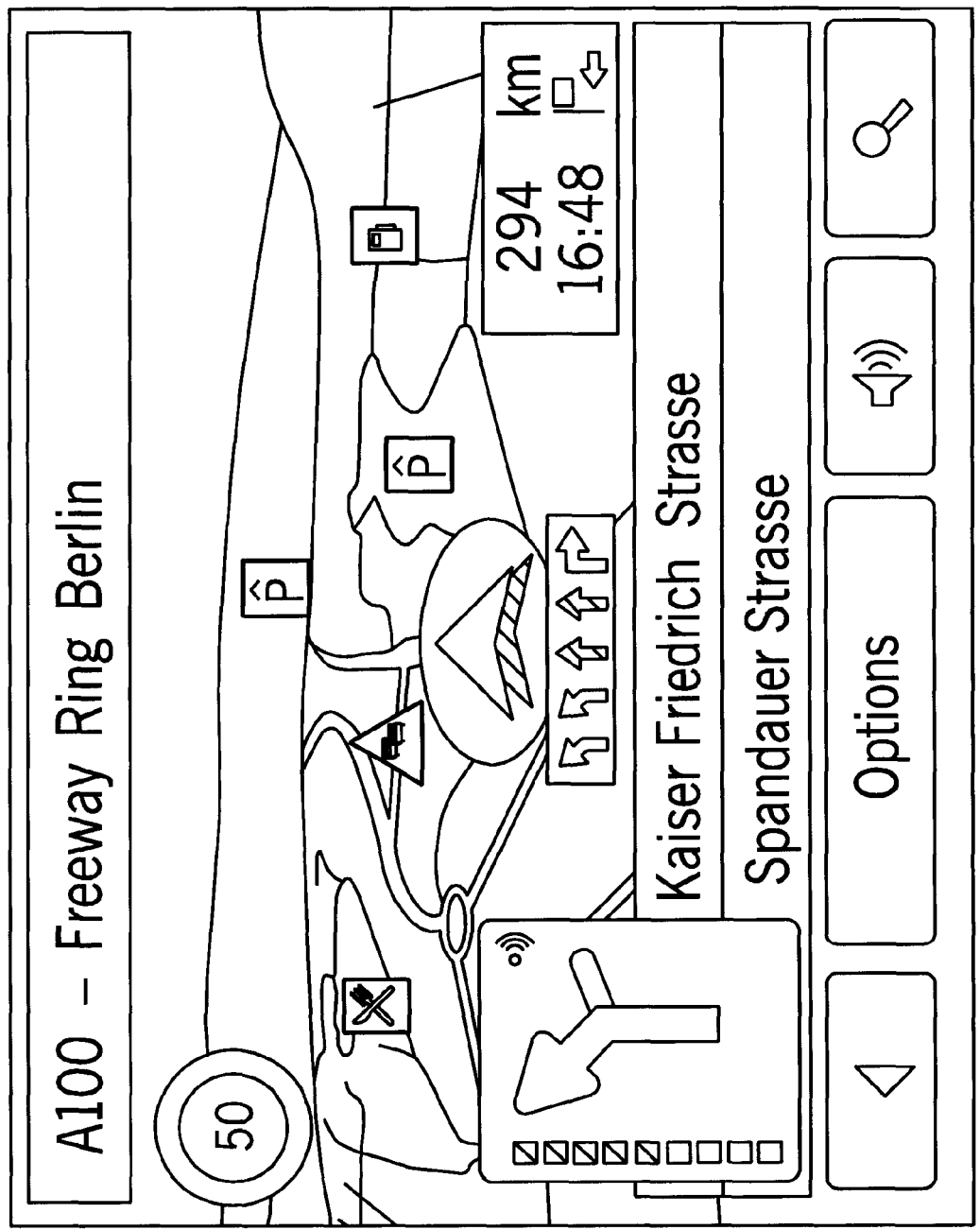
FIG. 3 shows a so-called Lane Info (lane situation) having Signpost (directional information)

FIG. 3 shows the known Lane Info principle. Information in regard to the lane situation prevailing at the turnoff situation is ascertained from the map material and is displayed during the navigation. The simple calculation of the lane situation does not make it possible, however, to generate an image of the exit having high recognition value for the user. The display means shown in FIG. 3 also show the direction specification and exit number (Signpost) at an intersection or exit in the navigation window. However, the display is restricted to only a part of the available information and is only reproduced in one line, without the actual destination being taken into consideration or identified.

Figure 4:
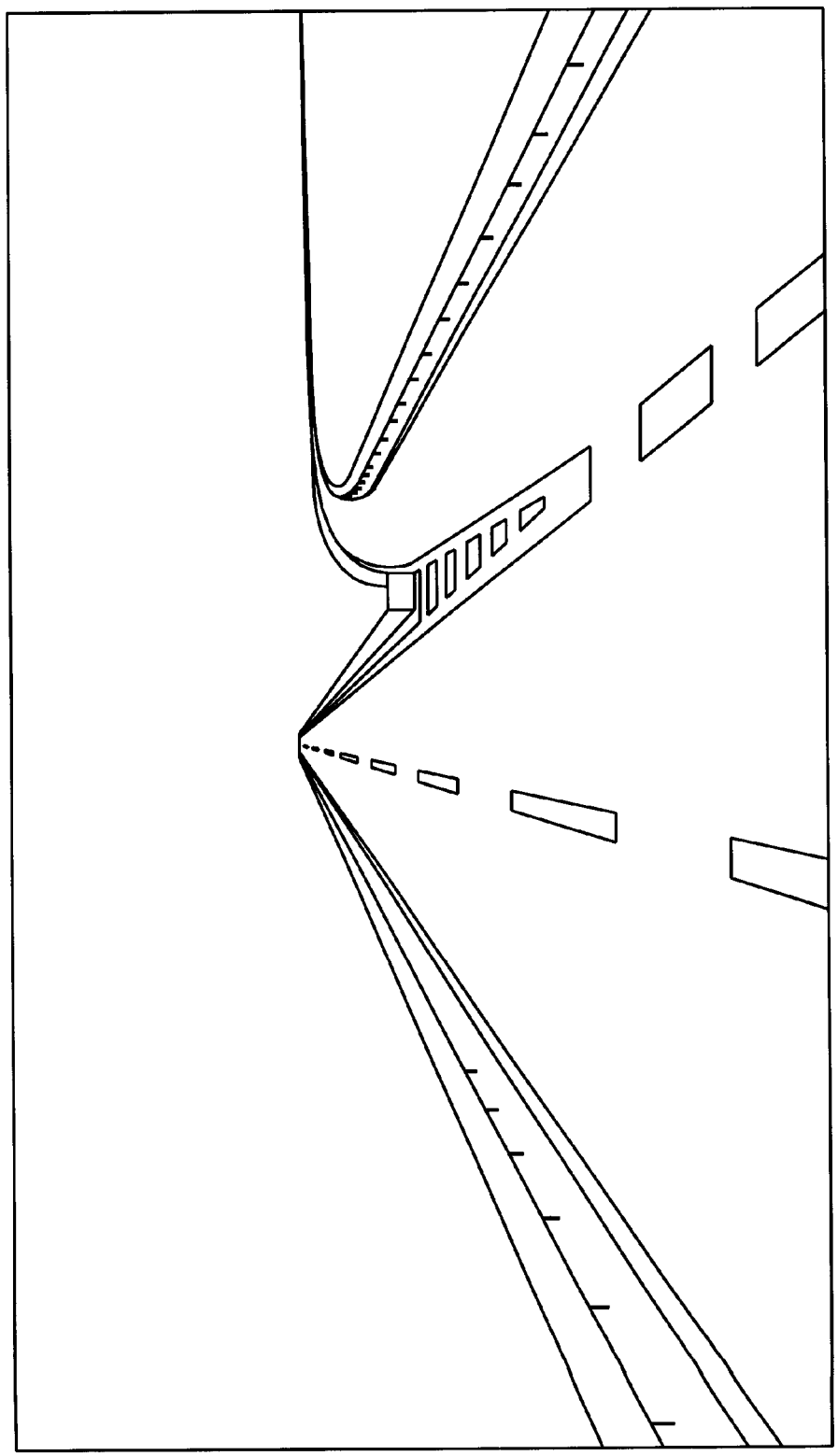
FIG. 4 shows a visualization layer having roadway information.

The following figures show on the basis of a concrete example how a device incorporating the invention prepares a visualization of the freeway exit having the number 72 on the freeway A3 in the direction Würzburg/Heidingsfeld. In the real signage on the roadway edge, various pieces of information are located on the signs in a type of list, which inform the driver about the coming exit. This information is, of course, also accessible by the navigation device using the road network database to which the navigation device has access. Based on this information, the lane number is requested, for example, using the Lane Info function (see description above). As a result, a pre-generated base view (two lanes on expressway straight ahead, one lane turns off on the right side) is provided by the device. Such a visualization layer is shown in FIG. 4.

Figure 5:
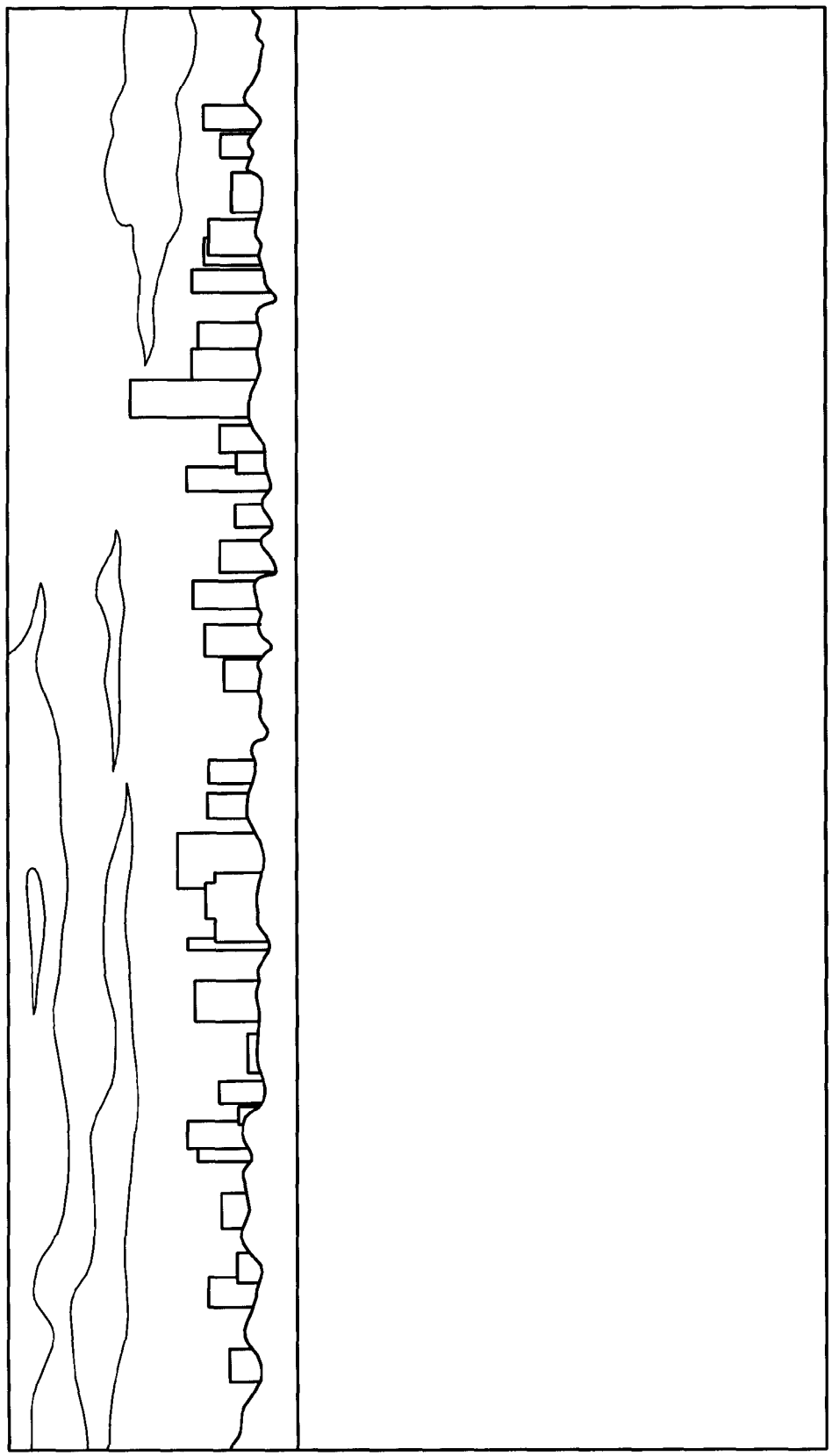
FIG. 5 shows a visualization layer having background information.
Figure 6:
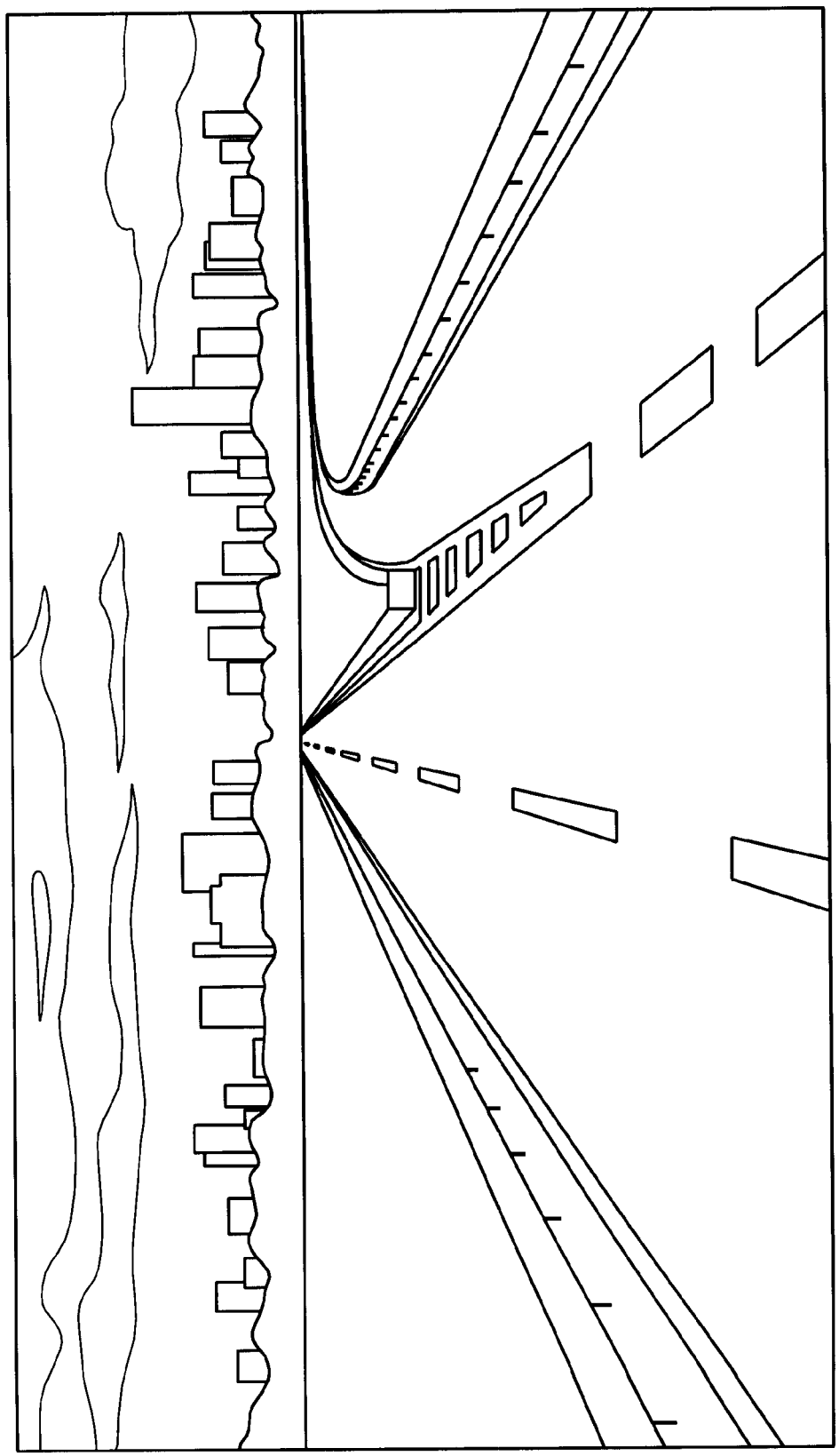
FIG. 6 shows the superposition of two visualization layers.

In addition, a background image is provided by the device as a further visualization layer matching the real surroundings, see FIG. 5. Since the road course to be shown represents a course of the road straight ahead without a bridge, both visualization layers known from FIGS. 4 and 5 are now combined using a first dynamic superposition. In the example shown, the time of day is also taken into consideration, which results in a daylight view having city background, because a built-up area not far from the exit in the travel direction was recognized by the device during the analysis of the road network database. FIG. 6 shows this combined view.

Figure 7:
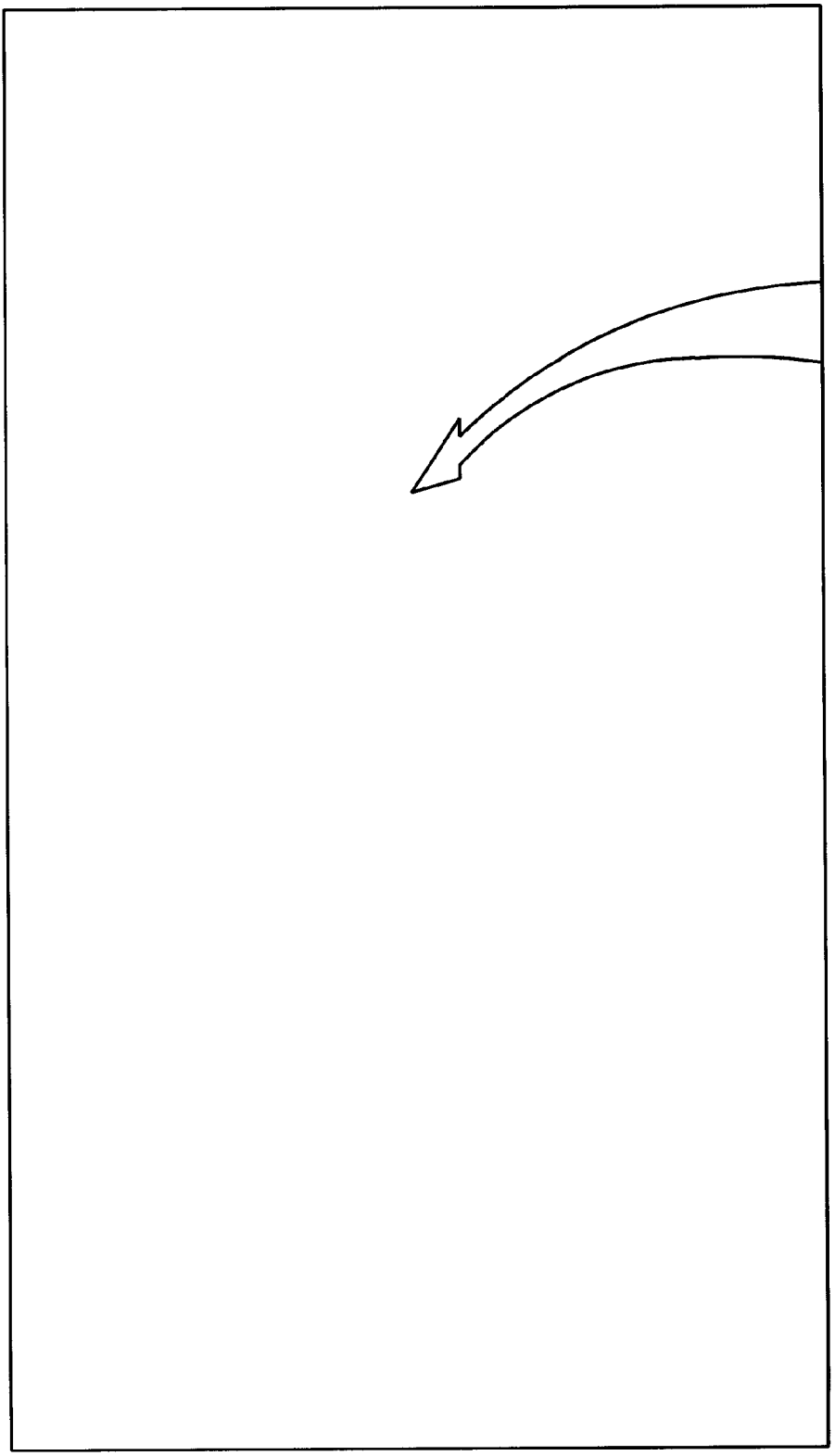
FIG. 7 shows a visualization layer having lane information.
Figure 8:
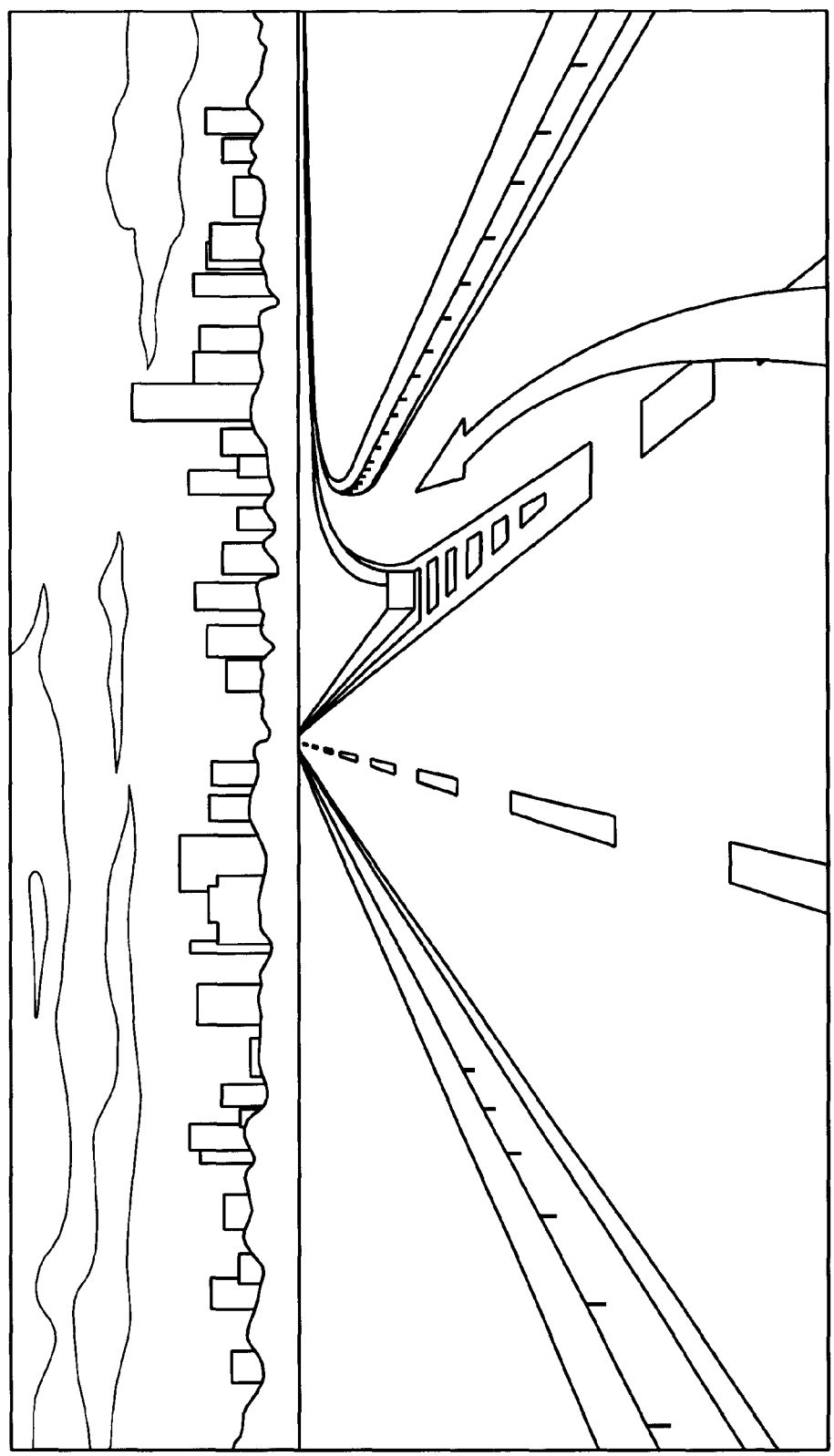
FIG. 8 shows the superposition of three visualization layers.
Figure 9:
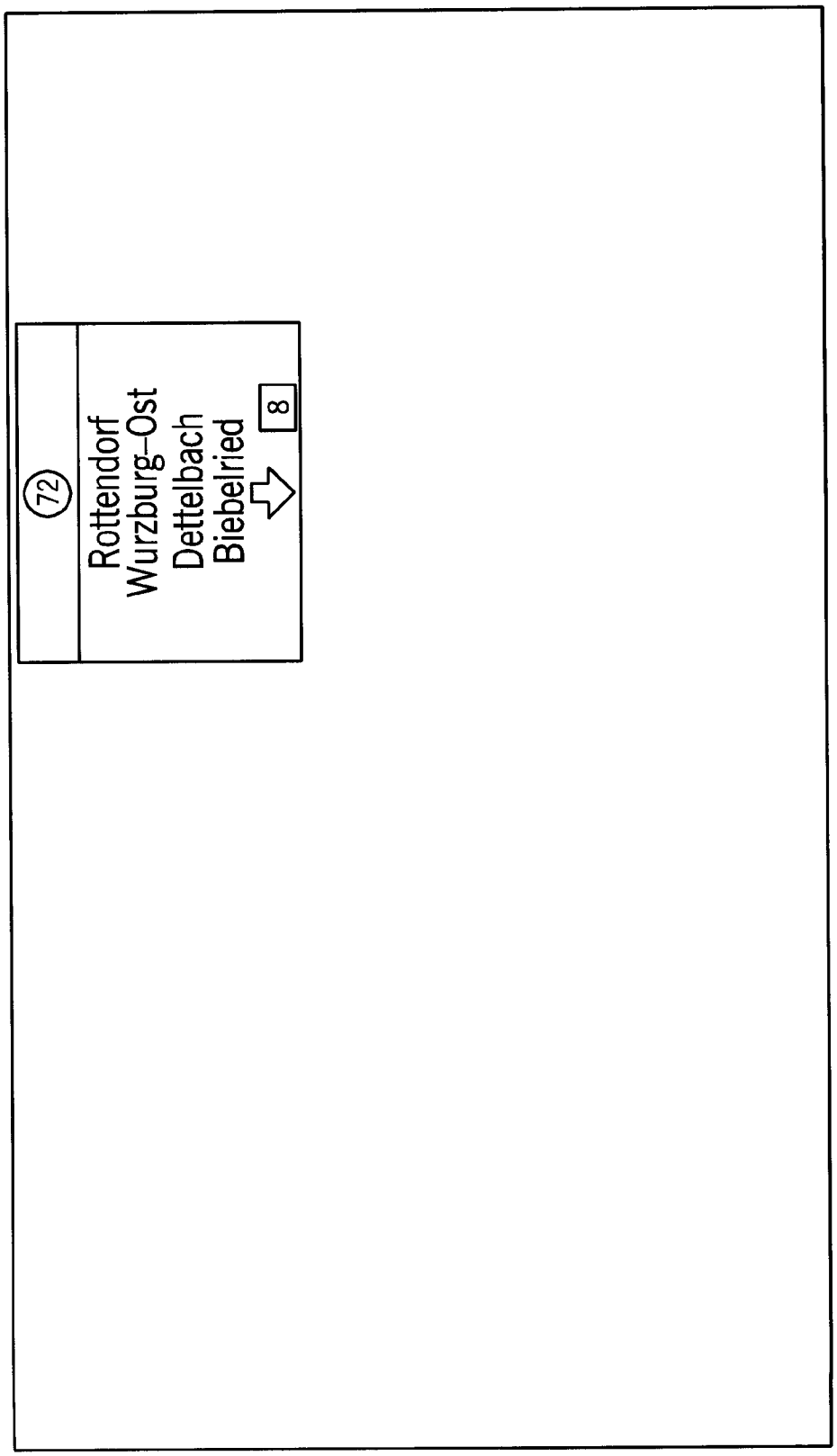
FIG. 9 shows a visualization layer having text information.

For lane courses, etc., the device provides symbols using a further visualization layer. For example, FIG. 7 shows how such a symbol may be shown. This layer is now superimposed with the previously described visualization layers. As a result, FIG. 8 shows the road transition required for following the ascertained route course, which the vehicle driver is to follow. The arrow symbol shown is drawn or overlaid in the suitable lane course by the device taking into consideration the actually existing lanes. Up to this point, three visualization layers have accordingly been used to dynamically generate the perspective illustration of a transition.

Now, using a fourth visualization layer, further very important information for the user is fused with the three visualization layers provided up to this point, namely an information sign in regard to the possible destinations and roadway numbers. Using the road network database and the current position, the device recognizes the existence of such information and then automatically prepares a rectangle having a blue background and white font, for example, to represent a freeway information sign which is as realistic as possible (typical representation for Germany). Four lines having the texts Rottendorf, Würzburg-Ost, Dettelbach, and Biebelreid, each in a separate line, are generated. In addition, the exit number "72", which is also introduced into the rectangle by the device, is generated. A further so-called tag (subset of the sign to be shown) inserted by the device in the sign symbolizes the Federal Highway "B8". The position of the tag and the color of the frame, the font, and the background, as well as the size and position of the tag are taken into consideration by the device. Typically, this information may be read out from the data of the digital map and is filtered out by the device upon access to the map data. If this information is missing in the map material, the device may be implemented in such a way that, for example, using retrievable presets for the design of traffic signs, country-specific information are employed using the device in a preprocessing step or are introduced by the device itself at the runtime and are used for the display. In this example, the tag was also incorporated in the sign which is to be represented using the visualization layer. Furthermore, it would be conceivable (not shown) to mark the desired travel direction and/or the desired destination or the next location lying on the route course on the sign. For example, if the user wishes to drive to Dettelbach, it would be possible for the device to specially mark the line "Dettelbach" using suitable visualization, for example, by framing it or giving it a colored background.

Figure 10:
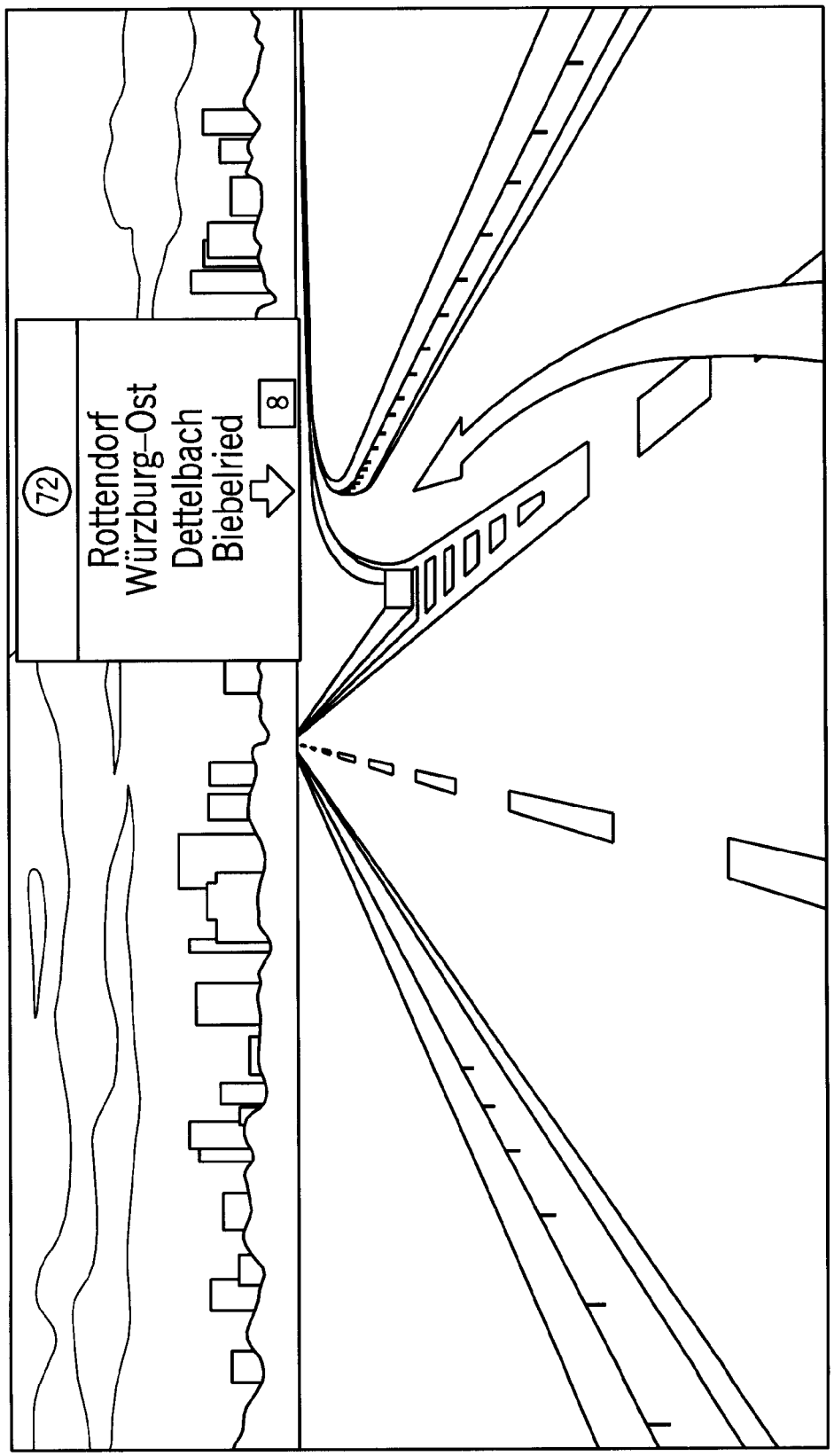
FIG. 10 shows the superposition of four visualization layers.
Figure 11:
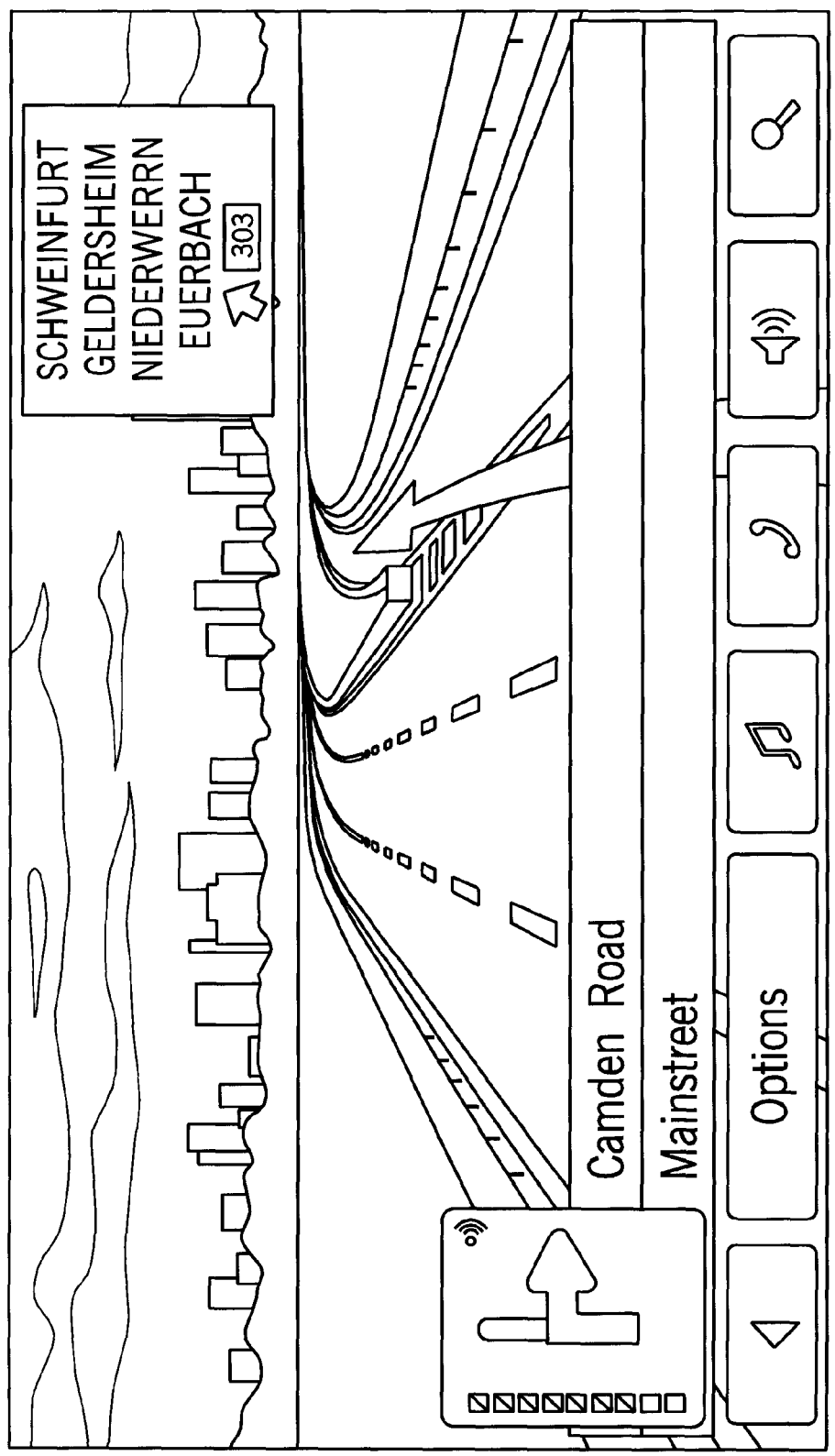
FIG. 11 shows additional overlaid navigation information.

The finished superposition of all four visualization layers is shown in FIG. 10. If one now adds the navigation-relevant instructions, one obtains the final screenshot from the running navigation application, as it becomes visible to the user during the complex transition maneuver on the display means of the navigation device incorporating the invention by automatic changeover of the operating mode (FIG. 11). After passing the transition, the automatic fading out is performed using the device. It is also to be noted that this image does not comprise specific image material stored for each transition in storage means, but rather was generated dynamically by the device during operation, at least from the moment from which the route course and/or the starting point and the destination point are known.

In summary, some of the method steps provided by the device will be listed once again, which may be used in arbitrary sequence and combination. The list is not to be viewed as exhaustive and method steps may be left out or provided optionally depending on the device version. The preparation of the perspective visualization using the device incorporating the invention may be implemented as follows, for example, the numbering not necessarily specifying the sequence according to which the steps are to be performed:

1. Ascertaining a freeway exit relevant for the routing.
2. Ascertaining the lane situation before and/or at and/or after the exit.
3. Ascertaining the road situation, in particular the curve situation for a partial route after the freeway exit, for the definition of a visualization layer which visualizes a following strong left or right curve for the user on the display means, for example.
4. Ascertaining the elevation data of the freeway exit using access to the road network database of a map producer to ascertain a further required visualization layer, for example, to show the course of the outgoing road after the exit as realistically as possible by suitable existing image data sets and/or visualization layers, which take into consideration a bridge or an underpass, for example. The bridge would be necessary if the following routing leads over the freeway and the underpass would be necessary if the following routing leads below the freeway.
5. Acquiring and visualizing further special properties of the exit and the immediate surroundings. Thus, for example, a tunnel entrance may also be visualized at some distance after the freeway exit using a suitable image data set and/or a suitable visualization layer. It would also be conceivable to accordingly visualize an exit in a tunnel or a bridge directly following the exit.
6. Ascertaining the time of day for the automatic generation of an image with a day or night view.
7. Ascertaining whether the exit situation is located in a built-up area or is located outside a built-up area to have a corresponding image data set with a suitable background image incorporated. For example: background selection of an image having high-rise buildings or an open landscape. If the exit is located inside a tunnel, this is also taken into consideration during the selection of a suitable image data set and/or a suitable visualization layer.
8. Providing visualization layers for the navigation view taking into consideration the road and lane situation in accordance with the real view.
9. As a further visualization layer, the device draws a visualization layer having arrows which identify the exiting lanes, which are accordingly advisable for the particular routing case. If multiple lanes exit from the freeway, all, one, or multiple lanes may alternately be identified as the lane to be traveled, as a function of the connection situation after the exit.

10. Ascertaining the relevant information for the labeling of traffic signs to be visualized using a further visualization layer, the following information being taken into consideration by considering the road network database, inter alia: background color and font selection (preferably separately for each line) for a traffic sign to be shown or the application of further information which is typically displayed on traffic signs, for example, the exit number of the exit to be followed, additional tags on the exit sign and, for example, the font color, line color, background color of the tag, special symbols for airports, for example, and position of the tag before or after the place name within a line. Route numbers of signboards or route numbers of the individual roads, the sequence of the individual lines, and thus the correct sequence of the place names on the sign also play a role.

11. Displaying all visualization layers having navigation-relevant information (advisor, etc.) as a dynamic, perspective overall image of a freeway exit, preferably according to rules which may be predefined.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

The invention claimed is:

1. A navigation device for visualizing a roadway transition along an ascertained route course, the navigation device comprising:
   a position determining unit operable to determine a current location of the navigation device;
   a memory including roadway information including a road network database having geometric properties and elevation data associated with roads, including roadway transitions, and distinct graphic elements associated with the roadway transitions, the graphic elements including roadway signage;
   a display; and
   a data processing device coupled with the position determining unit, the memory, and the display, the data processing device operable to:
      ascertain a route course to a desired destination,
      identify a roadway transition from a first road onto a second road along the ascertained route course,
      ascertain the curvature and elevation for the first road and the second road based on the geometric properties and elevation data for the first road and the second road,
      determine a continuous arrow along the ascertained route course based on the ascertained curvature and elevation for the first road and the second road,
      generate a roadway transition visualization by dynamically superpositioning a first visualization layer including the distinct graphic elements and a second visualization layer including the determined continuous arrow, and
      present navigation information in a first operating mode and a second operating mode on the display, the second operating mode including the generated roadway transition visualization;
   wherein the navigation information automatically changes from the first operating mode to the second operating mode when the current location is near the identified roadway transition; and
   wherein the first visualization layer includes road characteristics and location information and the second visualization layer includes the ascertained route course along the identified roadway transition and the continuous arrow passing through the identified roadway transition.

2. The navigation device as recited in claim 1, wherein the navigation information changes from the second operating mode to the first operating mode when the current location is no longer near the identified roadway transition.

3. The navigation device as recited in claim 1, wherein the roadway transition is a road intersection or a road branch.

4. The navigation device as recited in claim 3, wherein the road branch is a freeway exit.

5. The navigation device as recited in claim 1, wherein a large-area roadway transition visualization is derived and presented on the display if two or more roadway transitions are in close proximity to one another, wherein the large-area roadway transition visualization is sufficiently large to present the two or more roadway transitions.

6. The navigation device as recited in claim 1, wherein the graphic elements further include landscape features, bridges, underpasses, points of interest, icons, tunnels, or buildings.

7. The navigation device as recited in claim 1, wherein the road characteristics include the number of lanes, direction of traffic flow, and the direction of traffic flow based on the country associated with the identified roadway transition.

8. The navigation device as recited in claim 1, wherein the first visualization layer includes a roadway information layer depicting roadways and a background information layer depicting the surroundings of the identified roadway transition.

9. The navigation device as recited in claim 8, wherein the first visualization layer further includes a textual information layer depicting roadway signage with text stored in the memory.

10. The navigation device of claim 1, wherein the continuous arrow indicates a lane change to be performed.

11. A method for using a navigation device to visualize a roadway transition along an ascertained route course, the method comprising:
   determining a current location of the navigation device;
   storing roadway information including a road network database having geometric properties and elevation data associated with roads, including roadway transitions, and distinct graphic elements associated with the roadway transitions, the graphic elements including roadway signage;
   ascertaining a route course to a desired destination;
   ascertaining the curvature and elevation for the first road and the second road based on the geometric properties and elevation data for the first road and the second road;
   determining a continuous arrow along the ascertained route course based on the ascertained curvature and elevation for the first road and the second road;
   identifying a roadway transition from a first road onto a second road along the ascertained route course;
   generating a roadway transition visualization by dynamically superpositioning a first visualization layer including the distinct graphic elements and a second visualization layer including the determined continuous arrow; and presenting navigation information in a first operating mode and a second operating mode on a display, the second operating mode including the generated roadway transition visualization;

wherein the navigation information automatically changes from the first operating mode to the second operating mode when the current location is near the identified roadway transition, and wherein the first visualization layer includes road characteristics and location information and the second visualization layer includes the ascertained route course along the identified roadway transition and the continuous arrow passing through the identified roadway transition.

12. The method of claim 11, wherein the navigation information changes from the second operating mode to the first operating mode when the current location is no longer near the identified roadway transition.

13. The method of claim 11, wherein the roadway transition is a road intersection or a road branch.

14. The method of claim 13, wherein the road branch is a freeway exit.

15. The method of claim 11, wherein a large-area roadway transition visualization is derived and presented on the display if two or more roadway transitions are in close proximity to one another, wherein the large-area roadway transition visualization is sufficiently large to present the two or more roadway transitions.

16. The method of claim 11, wherein the graphic elements further include landscape features, bridges, underpasses, points of interest, icons, tunnels, or buildings.

17. The method of claim 11, wherein the road characteristics include the number of lanes, direction of traffic flow, and the direction of traffic flow based on the country associated with the identified roadway transition.

18. The method of claim 11, wherein the first visualization layer includes a roadway information layer depicting roadways and a background information layer depicting the surroundings of the identified roadway transition.

19. The method of claim 18, wherein the first visualization layer further includes a textual information layer depicting roadway signage with text stored in the memory.

20. The method of claim 11, wherein the continuous arrow indicates a lane change to be performed.

* * * * *